US008792340B2

(12) United States Patent
Chu et al.

(10) Patent No.: US 8,792,340 B2
(45) Date of Patent: Jul. 29, 2014

(54) ADMISSION CONTROL FOR SHARED LTE NETWORK

(75) Inventors: Thomas P. Chu, Englishtown, NJ (US); Tewfik Doumi, Edison, NJ (US); Dong Sun, New Providence, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 634 days.

(21) Appl. No.: 12/814,834

(22) Filed: Jun. 14, 2010

(65) Prior Publication Data

US 2011/0305137 A1 Dec. 15, 2011

(51) Int. Cl.
*H04L 12/26* (2006.01)
*H04W 28/04* (2009.01)

(52) U.S. Cl.
USPC ........... 370/230; 370/232; 370/236; 370/229; 370/338; 370/329; 455/404.1; 455/404.2; 455/445; 455/452.2

(58) Field of Classification Search
CPC ..... H04L 12/26; H04L 47/10; H04L 12/5695; H04L 47/30; H04W 28/04; H04W 4/22
USPC ......... 370/230, 232, 236, 468, 462, 338, 229, 370/329; 379/266.06, 221.07; 455/404.2, 455/445, 452.2, 404.1
See application file for complete search history.

(56) References Cited

U.S. PATENT DOCUMENTS

| | | | |
|---|---|---|---|
| 7,065,203 B1 * | 6/2006 | Huart et al. | 379/266.06 |
| 7,796,519 B2 * | 9/2010 | Yoshihara et al. | 370/236 |
| 2009/0245498 A1 * | 10/2009 | Sennett et al. | 379/207.02 |
| 2009/0327079 A1 * | 12/2009 | Parker et al. | 705/14.55 |
| 2010/0029243 A1 * | 2/2010 | Ozer et al. | 455/404.1 |
| 2011/0053553 A1 * | 3/2011 | Lambert et al. | 455/404.2 |

FOREIGN PATENT DOCUMENTS

EP 1478133 A2 11/2004

OTHER PUBLICATIONS

Qian et al, "A Novel Radio Admission Control Scheme for Multiclass Services in LTE Systems", 2009, Global Communications Conference, pp. 1-6.
Beard, "Preemptive and Delay-Based Mechanisms to Provide Preference to Emergency Traffic", 2005, Computer Networks, Elsevier Science Publishers B.V., vol. 47, No. 6, pp. 801-824.
"Digital Cellular Telecommunications System (Phase 2+); Universal Mobile Telecommunications System (UMTS); LTE, Priority Service Feasibility Study (3GPP TR 22.950 version 9.0.0 Release 9)", Technical Report, European Telecommunications Standards Institute, 2010; sections 6.1.1 to 6.2.2, 6.4.1 and 6.4.2.

(Continued)

*Primary Examiner* — Jamal Javaid
(74) *Attorney, Agent, or Firm* — Kramer Amado P.C.

(57) ABSTRACT

Embodiments of the present invention are directed to providing a method and system for call admission control for a Long Term Evolution (LTE) network shared between a plurality of user classes, such as, for example, a public safety user class and a consumer user class. An admission control module oversees the call admission process based on a specified policy profile. When there are insufficient resources in the network to support an incoming call, the admission control module will consult with a preemption module to determine whether, by preemption of lower priority calls, enough resources can be recovered to support the incoming call.

20 Claims, 7 Drawing Sheets

(56) References Cited

OTHER PUBLICATIONS

"3rd Generation Partnership Project; Technical Specification Group Services and System Aspects; Enhanced Multi-Level Precedence and Pre-emption Service; (eMLPP): Stage 1 (Release 9)", 3GPP Standard, 3GPP TS 22.067, 3rd Generation Partnership Project Mobile Competence Centre 650, V. 9.0.0, 2008, sections 4 and 4.1.

Sheu et al, "A Generalized Channel Preemption Model for Multiclass Traffic in Mobile Wireless Networks", IEEE Transactions on Vehicular Technology, vol. 56, No. 5, 2007, pp. 2723-2732.

Ahmad et al, "Preemption-Aware Instantaneous Request Call Routing for Networks With Book-Ahead Reservation", IEEE Transactions on Multimedia vol. 9, No. 7, 2007, pp. 1456-1465.

Balachandran et al, "Converged Wireless Network Architecture for Homeland Security", Military Communications Conference, 2005, pp. 1-5.

International Search Report dated Jul. 25, 2011, for corresponding PCT Application No. PCT/US2011/039219.

Preliminary Report on Patentability for PCT/US2011/039219 dated Jun. 14, 2010.

* cited by examiner

ADMISSION CONTROL FOR SHARED LTE NETWORK

CROSS REFERENCE TO RELATED APPLICATIONS

The present application is related to co-pending United States patent application entitled "CALL ADMISSION AND PREEMPTION FOR MULTIPLE BIT-RATE APPLICATIONS" (Chu et al.), filed concurrently herewith, the entire content of which is incorporated herein by reference.

FIELD OF THE INVENTION

The invention is directed to packet switching communication networks, and particularly to call admission control for a Long Term Evolution (LTE) network that is shared between a plurality of user classes such as public safety users and commercial users.

BACKGROUND OF THE INVENTION

Public safety agencies increasingly realize the importance of deploying multimedia applications such as streaming video. Prior art public safety wireless networks, such as the P25 systems are narrow band systems and lack the speed to support these applications. Therefore, public safety agencies are very much interested in deploying broadband wireless networks to support these new applications. Many public safety agencies have already expressed that LTE is their technology of choice for their broadband wireless networks.

A nationwide broadband network dedicated to public safety agencies would pose severe challenges: High installation costs, slow rate of deployment, complex and expensive operating and maintenance activities. One approach being considered is a public-private partnership whereby a commercial licensee would acquire additional spectrum at reduced price then use its own funds to roll out a network serving both consumers and public safety users. From the perspective of public safety, by sharing the infrastructure between public safety users and consumers, deployment costs would be lower and/or subsidized by the commercial service operator. Network deployment could be more rapid than that of a dedicated public safety network. Management of the network would also be the responsibility of the commercial operator, who has the expertise and is better equipped to manage a national wireless network. From the perspective of the commercial network operator, the spectrum can be acquired at a reduced rate. Since the network has more spectrum than a standalone commercial network, it can accommodate more users and thus more potential revenue.

Under such a scenario consumers and public safety users would contend for the same radio resources available. Recent rulings of the Federal Communications Commission (FCC) stipulated that in such a shared network, in times of emergency, public safety users would be given priority access to a first fraction of the combined spectrum and preemptive rights over another, second fraction. Current LTE standards are not optimized for call admission control appropriate to balance the needs of public safety users and consumers.

In view of the foregoing it would be desirable to provide an improved system and method to accommodate public safety users and consumers in a shared LTE network.

Referring to FIG. 1 illustrates a high level prior art network architecture of LTE. LTE User Equipment (UE) communicates wirelessly with an evolved node B (eNodeB) LTE base station. The Mobility Management Entity (MME) handles authentication and signaling for connection and mobility management. The serving gateway (S-GW) acts as mobility anchor for inter-eNodeB handover. The PDW Gateway (P-GW) provides interfaces to other IP networks and serves as the global mobility anchor for the UE. The Policy and Charging Rule function (PCRF) which supports per session QoS and associated billing. The Home Subscriber Server (HSS) maintains the user profiles. If the network operator also deploys an IP Multimedia Subsystem (IMS), the HSS can be shared between the LTE network and IMS.

SUMMARY OF THE INVENTION

Embodiments of the present invention are directed to providing a method and system for call admission control for a Long Term Evolution (LTE) network shared between a plurality of user classes, such as, for example, a public safety user class and a consumer user class. Three logical modules are described that, collectively, govern the call admission of an air-link in a LTE network that is shared between, for example, public safety users and consumers. The three modules are: a policy profile module; an admission control module; and a preemption module. Briefly, policy profile specifies the admission control policy of different user classes in the shared network. The admission control module oversees the call admission process based on the specified policy profile. When there are insufficient resources in the network to support an incoming call or when policy thresholds are exceeded, the admission control module will consult with preemption module to determine whether, by preemption of lower priority calls, enough resources can be recovered to support the incoming call.

Some embodiments of the present invention provide a system for providing call admission control for a Long Term Evolution (LTE) network shared between a plurality of user classes. The system comprises: a policy profile module for maintaining call type privilege parameters for each of the plurality of user classes; an admission control module for enforcing the call admission policy profile during call setup of an incoming call; and a preemption module configured to select calls to preempt when there are insufficient network resources to set up the incoming call, wherein one of the call type privilege parameters comprises a bandwidth cap.

In some embodiments of the present invention, one of the call type privilege parameters comprises a preemption protection bandwidth threshold.

In some embodiments of the present invention, one of the call type privilege parameters comprises respective bandwidth cap for each of the plurality of user classes.

In some embodiments of the present invention, the call type privilege parameters further comprise a relative priority for each of the plurality of user classes.

In some embodiments of the present invention, one of the user classes comprises a public safety user class.

In some embodiments of the present invention, one of the user classes comprises a consumer user class.

In some embodiments of the present invention, the admission control module is configured to determine if accepting the incoming call would cause network resources to be exceeded.

In some embodiments of the present invention, the admission module is configured to determine if accepting the incoming call would cause the bandwidth cap of the user class of the incoming call to be exceeded.

Another aspect of an embodiment of the present invention provides a system for providing admission control for a Long Term Evolution (LTE) network shared between a first class of users and a second class of users. The system comprises: a call admission policy profile module for maintaining call type privilege parameters; an admission control module configured to enforce the call admission policy profile during call setup; a preemption module configured to select calls to preempt when there are insufficient network resources to set up a call, wherein the call admission profile includes a first cap limiting maximum bandwidth of calls from the first class of users.

In some embodiments of the present invention, the call admission profile includes a first threshold of bandwidth of calls from the second class of users, protected cap limiting maximum bandwidth of calls from the second class of users.

In some embodiments of the present invention, the call admission profile includes a second cap limiting maximum bandwidth of calls from the second class of users.

In some embodiments of the present invention, the call admission profile includes a third cap limiting maximum bandwidth of calls from the first class of users.

In some embodiments of the present invention, the preemption module is configured to establish a list of potential preemption candidates from a list of established calls wherein the list of preemption candidates is sorted in a preferred order of preemption.

In some embodiments of the present invention, the preferred order of preemption is from low priority groups to high priority groups.

In some embodiments of the present invention, the preferred order of preemption is from last-established call to first-established call within each priority group.

In some embodiments of the present invention, the call admission profile comprises: a total bandwidth parameter; a maximum allowable total high priority traffic parameter; and a maximum allowable lower priority traffic parameter.

In some embodiments of the present invention, the call type privilege parameters comprise: a priority level parameter; a preemption privilege parameter; and a preemption vulnerability parameter.

Yet another aspect of an embodiment of the present invention provides a method of providing call admission control for a shared Long Term Evolution (LTE) network. The method comprises steps of: determining if an incoming public safety call would exceed a predetermined public safety call bandwidth threshold; and determining if the incoming public safety call would exceed a total available bandwidth; and if the public safety call bandwidth threshold or the total available bandwidth would be exceeded, invoking a preemption procedure to build a list of preemption candidates from a list of established calls wherein the list of preemption candidates is sorted in a preferred order of preemption.

BRIEF DESCRIPTION OF THE DRAWINGS

Some embodiments of apparatus and/or methods in accordance with embodiments of the present invention are now described, by way of example only, and with reference to the accompanying drawings in which.

In the figures like features are denoted by like reference characters.

DETAILED DESCRIPTION

Figure 1:
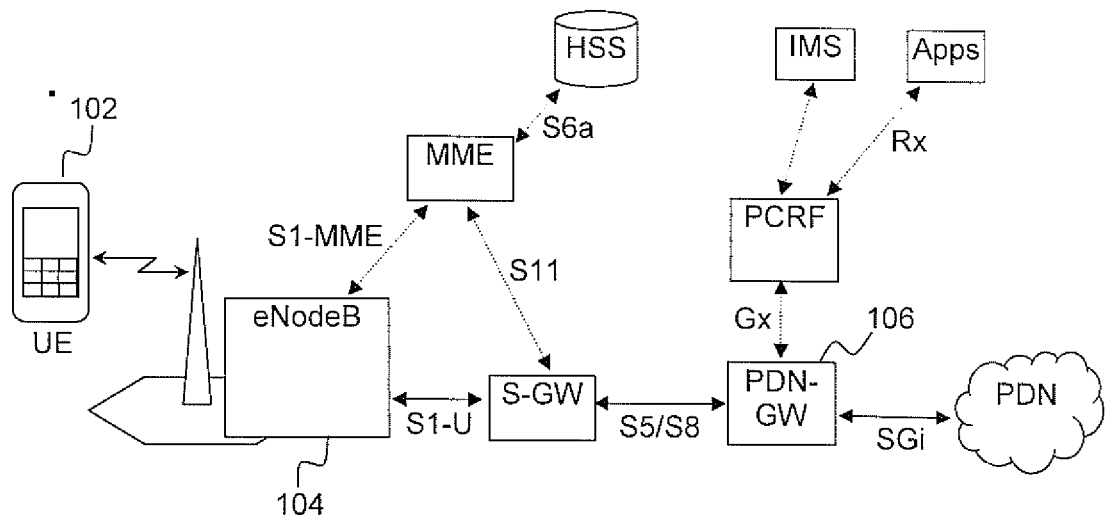
FIG. 1 is a high level prior art illustration of network architecture of an LTE network.

The description refers to public safety users and consumer users and to their respective user classes. It should be understood that these are merely examples of embodiments of the present invention. Reference to public safety call bearer setup refers establishing an LTE call for a public safety user and likewise, consumer call bearer setup refers establishing an LTE call for a consumer user of the network.

Operating a shared network supporting both public safety users and commercial users has a number of challenges. To be resource efficient, the network should accept all calls from either class of users if resources are available. However, the operator may want to add a number of policies to regulate call admission: The operator may want to ensure that a percentage of the network resources are always available to public safety users. Once this threshold is reached, calls from consumers will not be accepted. Of course, one can set this threshold to 0. In this case, calls from consumers will always be unlimited as long as resources are available. Similarly, the operation may also reserve a percentage of the network resources for commercial users such as consumers.

Resources may not be available when there is an incoming call from a public safety user. This may be due to the fact that the network has admitted many calls from consumers, beyond its minimum allocation. In this case, the network may want to preempt some of the consumer calls in order to admit the incoming call. However, the network should not allow the public safety call to preempt consumer traffic beyond a minimum allocation as described above.

Some consumer calls, such as 911 calls (emergency calls from consumer users), should not be preempted, even by public safety calls.

In LTE, the bearer set up signaling message contains the following parameters:

Service data flow templates which are used by the gateways to detect packets that belongs to a data flow, upstream and downstream. These templates are referred to as the TFT (traffic flow template);

QCI-QoS class identifier;

Upstream (UL) and downstream (DL) maximum bit rate (MBR);

Upstream and downstream guaranteed bit rate (GBR); and

Allocation and retention priority (ARP) parameter.

It is possible that the MBR and GBR (uplink or downlink) for a bearer to have different values. In many LTE implementations, the eNodeB would map the pair of values to a single value which is often referred to as the effective bandwidth (uplink or downlink respectively) of the call. To simplify description, in the subsequent paragraphs, the term bandwidth is used to mean the effective bandwidth of the call (or the value pair).

In many applications, the bandwidth required for the uplink and downlink directions are different. Also, the physical bandwidth of the uplink and the downlink is different. The downlink typically has higher capacity than the uplink. Therefore, the logic for admission control and preemption are handled separately for the uplink and the downlink. However, the processing logic is the same for both directions. In the subsequent description, the invention is described for a single direction. In actual implement, two identical processes will be implemented in the eNodeB to managing call admission and preemption for uplink and downlink respectively.

In some applications, an existing call or other application could drop down in speed or bandwidth to release bandwidth for another call. For example, in a streaming video application, the application can lower its bandwidth by adjusting the value of its quantizer, reduce the resolution of the picture (less pixels), and/or frame rate or color resolution. It is not necessary for the call to be disconnected entirely. For simplicity, in this document, the term "preempted" can mean either a call is disconnected or the bandwidth is reduced.

In public safety applications, calls could have one of many priority levels. Each priority can have its own thresholds.

The policy profile could be different at each locality, down to the cell level if necessary. When an emergency occurs at a locality, the network operation would like to be able to change the policy at that location quickly.

Figure 2:
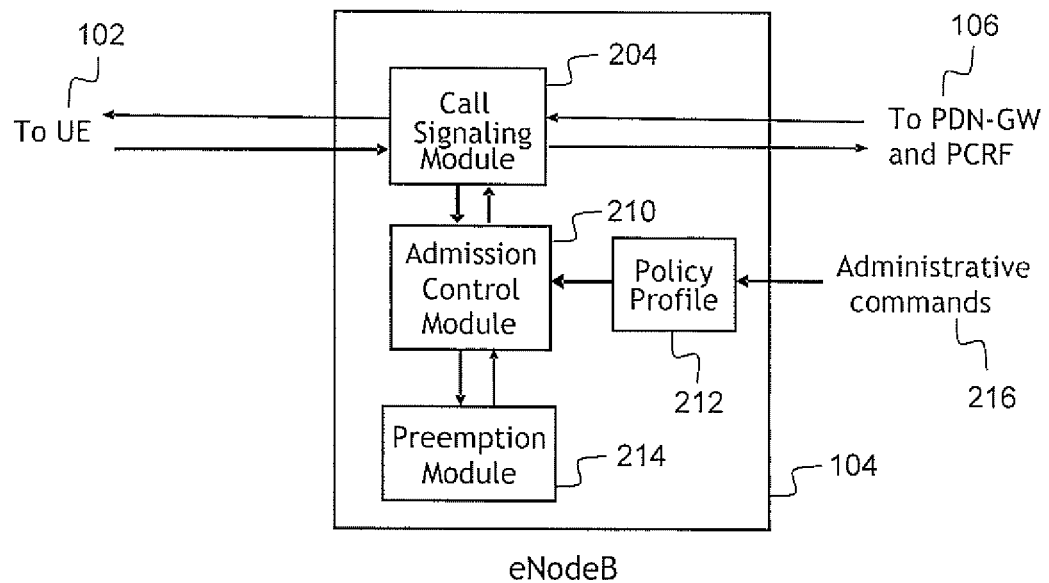
FIG. 2 is an illustration of an exemplary logical architecture of a Call Admission system at an eNodeB of an LTE network.

FIG. 2 illustrates a logical architecture of a call admission process at an eNodeB 104 of a Long Term Evolution (LTE) network shared between a plurality of user classes, such as, for example, a public safety user class and a consumer user class. A call signaling module 204 handles call set up requests from user equipment 102 or from the network via a public data network gateway (PDN-GW) 106. A policy profile 212 specifies the admission control policy of different user classes in the shared network. The profile is administratively configured by a network operator. Admission control module 210 oversees the call admission process based on the specified policy profile 212. When there are insufficient resources in the network to support an incoming call, the admission control module 210 will consult with Preemption Module 214 to determine whether, by preemption of lower priority calls, enough resources can be recovered to support the incoming call. Preemption in this document would mean (1) a call is disconnected, or (2) the amount of network resources committed to support the call is reduced. In the latter case, the network would inform the user-terminals that QoS of the call has been changed through call signaling.

The policy profile provides a small set of parameters that the network operator can configure. By configuring these parameters, a number of operational profiles can be achieved. Examples of how some of the commonly discussed profiles can be achieved are presented. Embodiments of the present invention also specify the call admission control logic for high priority public safety calls, low priority public safety calls, and consumer calls.

In general, public safety calls could have one of multiple priority levels. To simplify the description, this document will describe embodiments with only two levels of the public safety calls, priority 1 and priority 2, with priority 1 being higher than priority 2. Other embodiments of the present invention could support multiple priority levels. As an example, the ARP parameter of the higher priority public safety traffic could be encoded as follows:
 The priority level=1
 The preemption capability flag is set to TRUE
 The preemption vulnerability flag is set to FALSE.

The ARP parameter of lower priority public safety traffic is encoded as follows:
 The priority level=10
 The preemption capability flag is set to TRUE
 The preemption vulnerability flag is set to TRUE.

The ARP parameter of lower priority consumer traffic is encoded as follows:
 The priority level=11 or 12
 The preemption capability flag is set to TRUE for calls with priority 11
 The preemption vulnerability flag is set to TRUE for calls with priority 12.

The profile includes the following parameters:
 B=The total capacity of the air link.
 P1=The maximum allowable total public safety traffic (threshold or cap).
 P2=The maximum allowable lower priority public safety traffic (threshold or cap).
 C1=The maximum allowable consumer traffic (threshold or cap).

The protected consumer traffic (C2): If the total consumer traffic is less than or equal to the value of C2, no consumer traffic will be preempted by public safety traffic, regardless of the priority of public safety call. Note that, because of heavy public safety traffic, it is possible that incoming consumer calls be blocked even if the total consumer traffic at that time is less than C2 bps.

The eNodeB would know the value of parameter B. This value may change with time due to environmental factors at a cell site. The other parameters are administrative set for each air link under the control of the eNodeB. In general, they are specified as a percentage of B. For ease of description, in the following descriptions, we are assuming the all the parameters are in units of bits per second (bps). Note that, among the parameters, the following relationship exists:
 $0 \leq P2 \leq P1 \leq B$ and $0 \leq C2 \leq C1 \leq B$ By judicious setting of the above parameters, various operational profiles can be configured. The following are some representative profiles.
 Profile 1:
 P1=B, and
 C1=C2=½*B
Under this profile, there is only a single class of public safety users, which can access the entire bandwidth if it is needed. Consumers can access up to one-half of the total bandwidth. As C1=C2, consumer traffic will not be preempted.
 Profile 2:
 P1=B,
 C1=B
 C2=½*B
Under this profile, there is only 1 class of public safety users. Both public safety users and consumers can access all the available bandwidth at any time. However, if consumers uses more than C2=½*B bps of bandwidth, traffic in excess of C2 can be preempted by incoming public safety calls.

Note that certain consumer traffic may not be preempted by incoming high priority public safety calls regardless of the current consumer traffic load. An example of this would be 911 VoIP calls (assuming that the eNodeB is aware that a call is a 911 call). The call preemption control module should take this fact into account.
 Profile 3:
 P1=B,
 P2=¾*B
 C1=B bps
 C2=½*B This profile is very similar to profile 2, except that it has 2 classes of public safety calls. Public safety calls can use up to the full bandwidth. However, the second class of the public safety calls can not exceed ¾ of the total bandwidth. Consumer traffic can also use up to the maximum bandwidth. However, traffic in excess of half capacity can be preempted by public safety calls.

From the above examples, we can see that, with appropriate setting of the parameters, the model can support many profiles. The policy can easily be extended to support more than two classes of public users.

Call Signaling and the Encoding of the ARP Parameter

In one embodiment of the invention, the network operator will assign a value of the priority field in the ARP parameter to indicate that the bearer set up request is from a high level public user. When a public user requests a high priority bearer to be set up, the UE will encode the priority field using the assigned field. Similarly, the network operator will also assign another value to represent bearer setup from low priority public safety users and consumers respectively. The values assigned to high priority public safety users would indicate higher priority than the lower priority public users which, in turn, has higher priority than consumers.

With this assignment, the eNodeB would be able to distinguish whether a bearer setup request is from a high priority public safety user, a lower priority public safety user, or a consumer. Other implementations are also possible. For example, a new information element (IE) can be added to the Bearer Setup Request call signaling message to indicate this information.

For all public safety bearer setups, the "preemption capability" is also set to TRUE. This is because all public safety calls can potentially preempt consumer calls that exceed its allocated threshold. The preemption "vulnerability" bit of the ARP parameter are set to TRUE for the lower priority public safety calls, as lower priority public safety calls can be preempted by higher priority public safety calls.

In embodiments of the present invention, if preemption is deemed necessary, a high priority public user call would:

First, preempt consumer calls that exceed the allowable threshold or cap. Consumer calls with preemption vulnerability bit set to TRUE are preempted first before those with the bit set to FALSE. Preemption of consumer calls would stop once the amount of consumer traffic is reduced below the allowable threshold.

If more calls need to be pre-empted, then it will preempt the lower priority public safety calls.

Similar logic applies to lower priority public safety calls. If preemption is deemed necessary, a lower priority public user call would preempt consumer calls that exceed the allowable threshold or cap. Consumer calls with preemption vulnerability bit set to "TRUE" are preempted first before those with the preemption vulnerability bit set to FALSE. Preemption of consumer calls would stop once the amount of consumer traffic reduced below the threshold.

Consumer calls can only preempt other consumer calls that:

Have lower priority than the incoming consumer call
Have the preemption vulnerability bit is set to TRUE.

Note that the term "user" in this document is a logical concept. It may represent an application residing at a UE. For example, one application from a public safety UE may request a high priority public safety call while another application from the same UE may request a lower priority public safety call.

Call Admission Control

The call admission control module maintains the following information:

$x1$=current total public safety traffic (bps).
$x2$=current P2 public safety traffic (bps).
$y1$=current total consumer traffic (bps).
$d$=traffic demand for the incoming call (bps).
$R$=recoverable bandwidth with preemption (bps).
$y2$=remaining consumer bandwidth after preemption.

Call Admission Control for High Priority Public Safety Traffic

Figure 3:
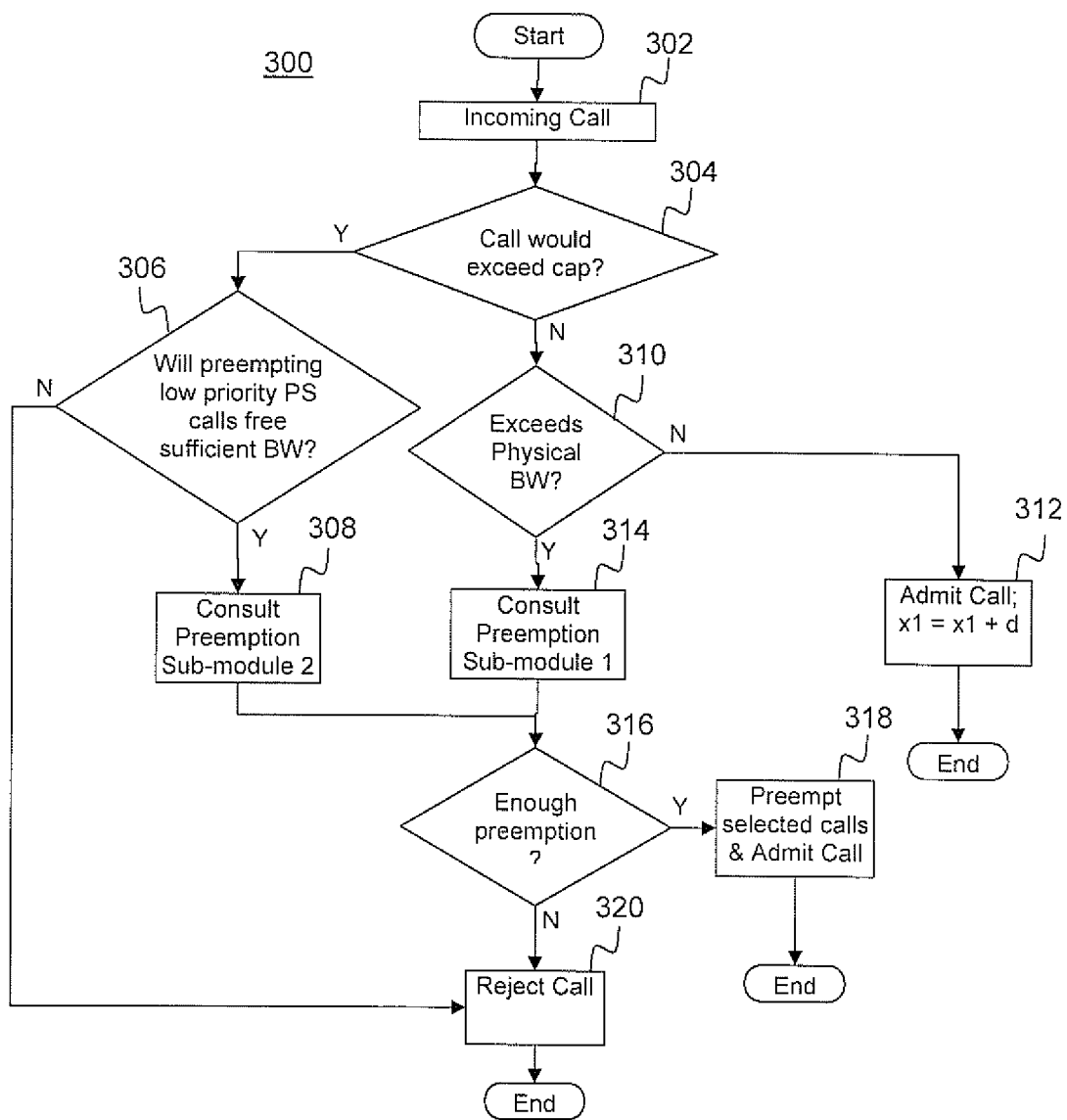
FIG. 3 illustrates a flow chart for an embodiment of a call admission control process for high priority public safety call bearer set up.

FIG. 3 illustrates a flow chart for the call admission control process of high priority public safety calls. At step 302, a high priority public safety call arrives with demand "d" (bps). A step 304, the Admission Control module checks whether, by accepting the incoming call, the total public safety traffic exceeds the allowable bandwidth cap (or threshold) for public safety users, i.e. whether $x1+d>P1$. If, by accepting the incoming call, the amount of total public safety bandwidth is less than P1, the algorithm proceeds to step 310. Otherwise, the algorithm proceeds to step 306.

At this step 306, the algorithm knows that if it accepts the call, the total public safety traffic will exceed P1. The algorithm checks whether by preempting lower priority public safety traffic, the total traffic public safety traffic would be below the P1 after accepting the call. Thus the algorithm checks whether $x2>d$ ($x2$ is the current total low priority public safety traffic). If $x2>d$, then the algorithm can preempt enough lower priority traffic to accept the call. In this case, the algorithm will proceed to step 308. Otherwise, the call would not be admitted and the incoming call is rejected at step 320.

At step 308, the call admission module will check with Preemption Sub-module 2 to determine which lower priority public safety calls should be preempted so that the incoming call can be accepted.

At step 310, the algorithm checks whether by accepting the incoming call, the total bandwidth exceeds the physical bandwidth, i.e. $x1+y1+d>B$. If the total bandwidth does not exceed the physical bandwidth (i.e. $x1+y1+d=<B$), then at step 312 the call is admitted and the value of $x1$ is updated to $x1+d$.

At step 314, if $x1+d>B$, the call admission module will check with the Preemption Sub-module 2 whether, by preemption, enough bandwidth can be freed up to support the incoming call. At step 316, if Preemption Sub-module 2 determines that by preempting existing preemptable calls, enough bandwidth can be recovered, then at step 318, the calls selected by Preemption Sub-module 2 are preempted, the incoming call is then admitted, and appropriate signaling messages are sent to the end-points of the preempted calls. The value of $x1$ would also be updated to $x1+d-d1$, where $d1$ is the bandwidth of the pre-empted calls.

At step 316, if the Preemption Sub-module 2 determines that insufficient bandwidth would be recovered by preempting other preemptable calls, then at step 320, the incoming call will be rejected. Depending on the policy of the network operator, the call requested can be queued or rejected. In either case, the appropriate signaling message is sent to the call originator.

Preemption

An incoming call may request network resources such that, if admitted, would cause the traffic of a particular class to exceed its allowable threshold (cap) or exceed the physical bandwidth available. The function of the preemption module is, in these circumstances, to check whether preempting existing lower priority calls, could free up enough bandwidth so that these threshold(s) would not be exceeded. Because of the discrete nature of a call, more bandwidth may be preempted to support an incoming call, above the exact amount required for the particular incoming call. For example, the incoming call may require 4 Mps while a call of 5 Mbps is preempted to accommodate the incoming call.

The eNodeB maintains a database of all existing calls for each air-link and the information is available to the preemption module. For each call, the following information is included:

Bearer-ID
The ID of the UE
QoS (Quality of Service) profiles which includes QCI (QoS Class Identifier), priority, bit rate, QoS levels, GBR (Guaranteed Bit Rate), MBR (Maximum Bit Rate), etc.
Time when the call is admitted Preemption Sub-Module 1

Two preemption modules are associated with high priority public safety calls, depending on why preemption is triggered. Sub-module 1 is triggered when:

The incoming call would not cause the total public safety traffic to exceed P1.
The incoming call would cause the total traffic (public safety calls plus consumer calls) to exceed the physical bandwidth.

In this case, consumer calls that exceed the C2 threshold should be preempted first. Once the consumer traffic is below the C2 threshold, it should not be preempted further. If more bandwidth is needed, then low priority public safety should be preempted.

One aspect of the preemption module is the algorithm to select the calls that would be preempted for the incoming call. Generally, calls with the call vulnerability bit in the ARP parameter set to TRUE should be preempted first, before calls whose call vulnerability bit set to FALSE.

One aspect of the present invention is determining which calls are preempted first from among calls whose call vulnerability bit is set to the same value. There are many possible algorithms, fairness being a major criterion. When preempting excessive consumer traffic, one embodiment of the invention provides a "last-in-first out (LIFO)" selection criterion. The rationale for this selection criterion is that the latest calls are the calls that drove the traffic beyond the threshold and so they are the first calls that should be preempted.

For high priority calls, for the case where the physical limit of the air link is exceeded, if the call is accepted, Preemption Sub-module 1 is executed in two stages. In the first stage, consumer calls that exceed the C1 threshold are preempted. In the second phase, lower priority calls are preempted.

Figure 4A:
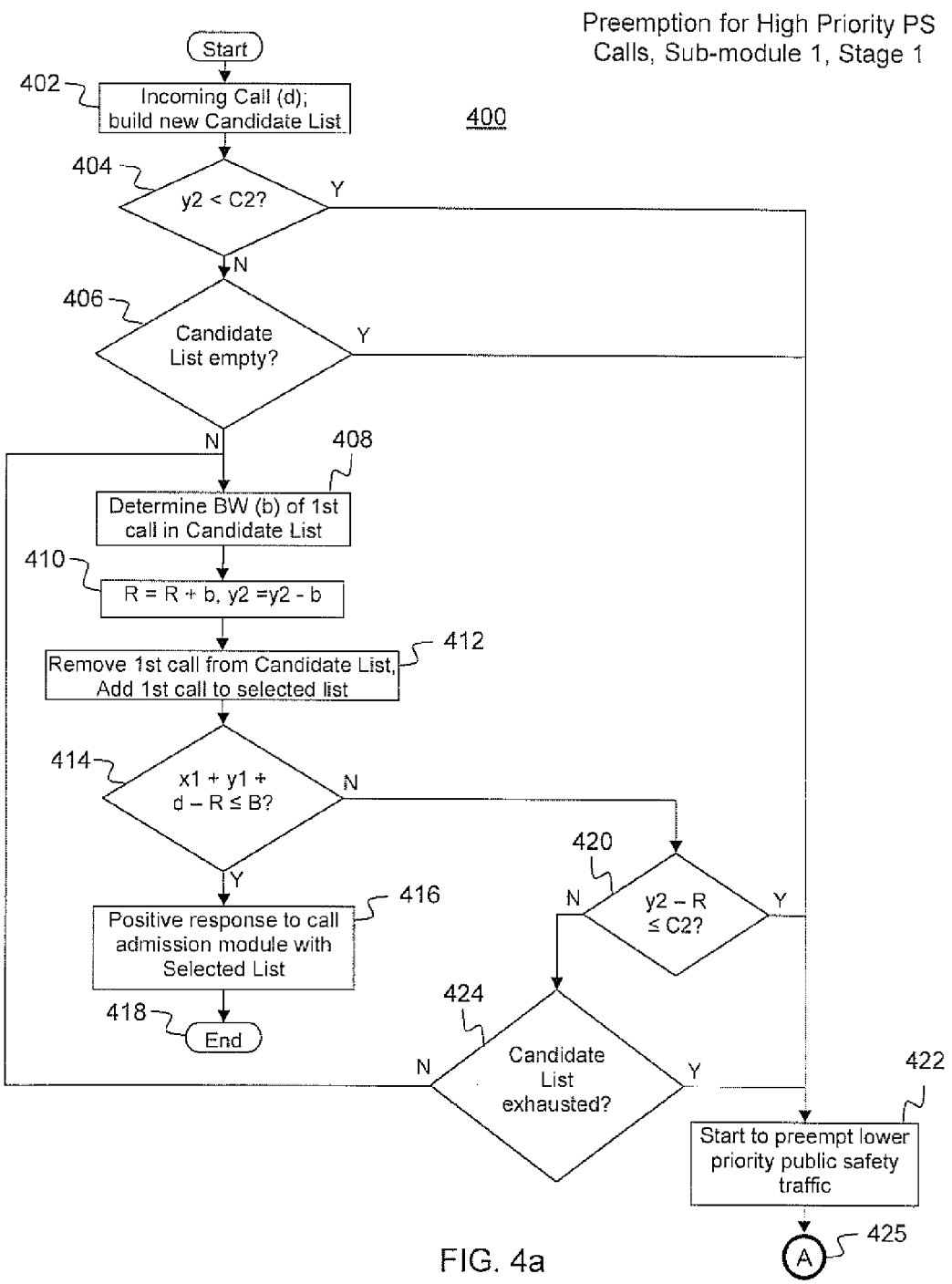
FIG. 4a illustrates a flow chart for an embodiment of stage 1 of a first sub-module of a call preemption process for high priority public safety call bearer set up.
Figure 4B:
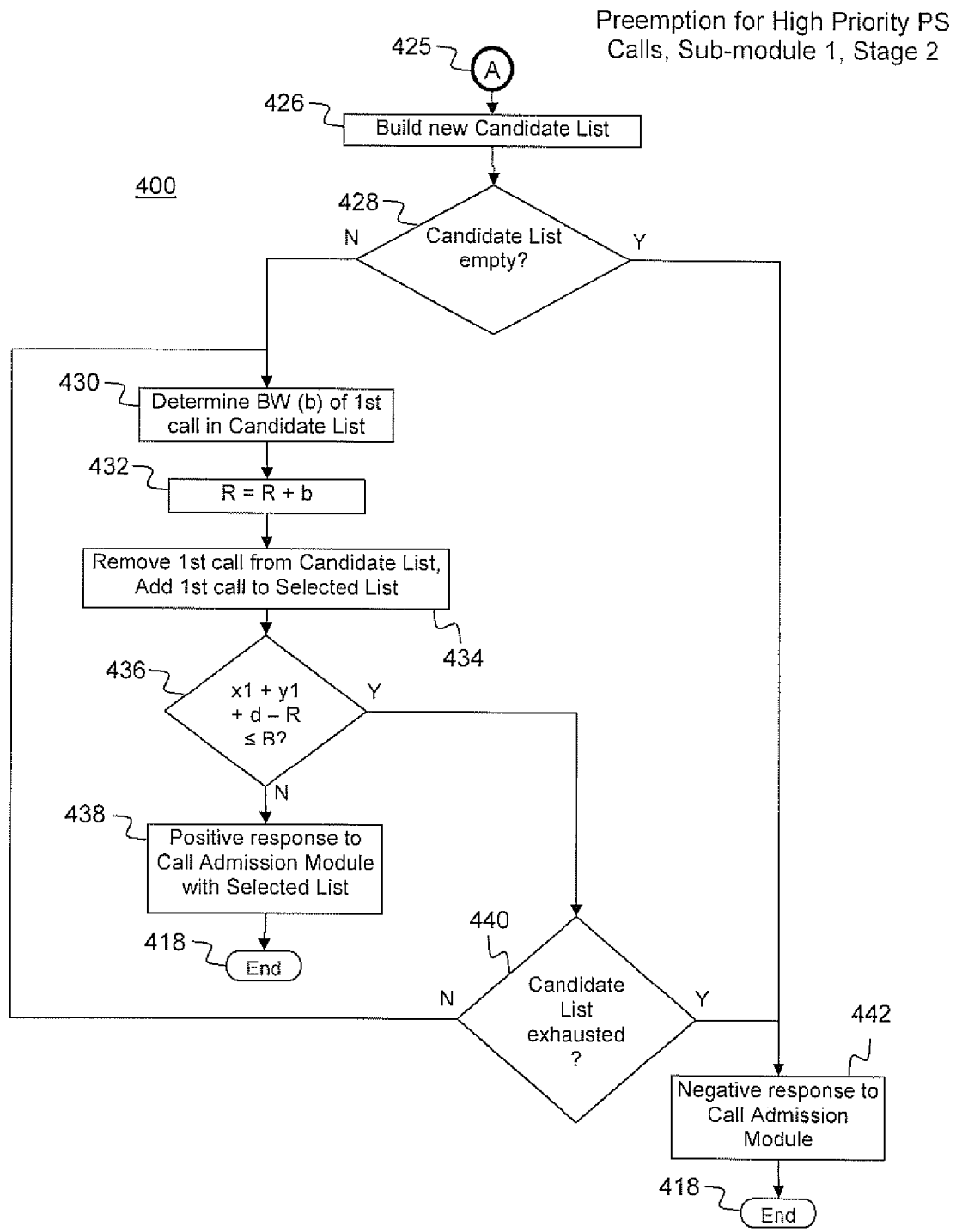
FIG. 4b illustrates a flow chart for an embodiment of stage 2 of a first sub-module of a call preemption process for high priority public safety call bearer set up.

FIG. 4a and FIG. 4b present the flowchart for the 2 stages of a LIFO based preemption algorithm respectively. The first stage is presented in FIG. 4a. The Sub-module 1 of preemption process 400 is triggered from step 314 described previously.

Thus at step 402, preemption is required for an incoming call with demand="d" bps. The process initializes the following parameters:

The parameter R represents the bandwidth that is currently recovered by preempting selected calls and is initialized to 0
The parameter y2 represents the total consumer traffic should the calls in the Selected List be preempted, and is initialized to 0.
A Candidate List is created. This list is initialized as an empty list.
A Selected List, of calls selected for preemption, is created and initialized as an empty list The Candidate List is initialized as an empty list and is then populated with existing consumer calls which could potentially be preempted. Some consumer calls, such as 911 emergency consumer calls should not be preempted and thus would not be added to the list. Calls on the list are arranged in order of preemption priority, such that calls best suited for preempting appear first. Thus calls with the preemption vulnerability bit set to TRUE are placed first in the list, before those with the bit set to FALSE. In one embodiment, among the calls having the same call vulnerability value, the calls are arranged in the reverse order of the time that the call was admitted.

At step 404, the process checks whether the amount of total consumer traffic y1 is less than the threshold C2, then the consumer traffic should be protected and should not be preempted. The algorithm would proceed to step 422 to begin to preempt lower priority public safety calls instead. Otherwise, if the amount of consumer traffic exceeds the threshold, then the process proceeds to step 406, where the process checks if the Candidate List of consumer calls is empty. If it is empty, then there are no consumer calls available for preempting and the process proceeds to step 422. Note that it is possible that y2>C2 but the Candidate List is empty which could arise if all the consumer calls are non-preemptable, such as 911 emergency consumer calls. If the Candidate List is not empty, the process proceeds to step 408 which determines the bandwidth "b" of the first call in the list.

At step 410, the process updates R to R+b, and y2=y2−b. Thus, if the first call on the Candidate List is preempted, the recovered bandwidth is increased by b and the total consumer traffic is decreased by b. At step 412, the first call on the Candidate List is removed from the Candidate List and added to a preemption Selected List (the Selected List). At step 414, the process checks whether enough bandwidth has been recovered (i.e., $x1+y1+d-R \leq B$) and no further preemption is required, in which case the process proceeds to step 416 where the preemption module then returns a positive response, together with the Selected List, to the call admission module.

If not enough bandwidth has been recovered then the process continues to step 420 to determine if more consumer calls should be preempted. Thus, if the total consumer traffic, should all the selected call be preempted, is less than or equal to C2, (i.e., $y2-R \leq C2$) the module should not preempt additional consumer calls but proceed to preempt lower priority public safety traffic, in which case the process proceeds to step 422.

If there is still available consumer bandwidth above the protected threshold, then at step 424, the process checks if there are still preemptable calls in the Candidate List. If the Candidate List is exhausted, the process continues to step 422, otherwise, the process returns to step 408 to evaluate additional candidate calls.

At step 422, the process will start to evaluate lower priority public safety calls for preemption and continues via label "A" (425) to stage 2 of Sub-module 1 in FIG. 4b. Stage 2 deals with the preemption of lower priority public safety calls. The logic of stage 2 is similar to stage 1.

At step 426, the Candidate List is re-initialed to zero and then populated with all the lower priority public safety calls which could potentially be preempted. In one embodiment, the lower priority public safety calls are arranged in the reverse order of the time that the calls were admitted.

The Selected List contains consumer calls from stage 1 that were selected for preemption. The Selected List is maintained with the current entries. The parameter R also maintains its current value.

At step 428, the process checks whether the Candidate List is empty. If it is empty, there is no further preemption possible and the process continues to step 442 where a negative response is sent to the call admission module (see step 316).

If the Candidate List is not empty, the process proceeds to step 430, where the bandwidth "b" of the first call in the Candidate List is determined. At step 432, the process updates R to R+b. At step 434, the first call on the Candidate List is removed from the Candidate List and added to the preemption Selected List (the Selected List).

At step 436, the process checks whether enough bandwidth has been recovered (i.e., x1+y1+d−R≤B) and no further preemption is required, in which case the process proceeds to step 438 where the preemption module then returns a positive response, together with the Selected List, to the call admission module. If insufficient bandwidth has been recovered through preemption then the process proceeds to step 440 to determine if the Candidate List has been exhausted (is empty) in which case the process proceeds to step 442, otherwise the process continues to step 430 to evaluate the next candidate call in the Candidate List.

Preemption Sub-Module 2

Figure 5:
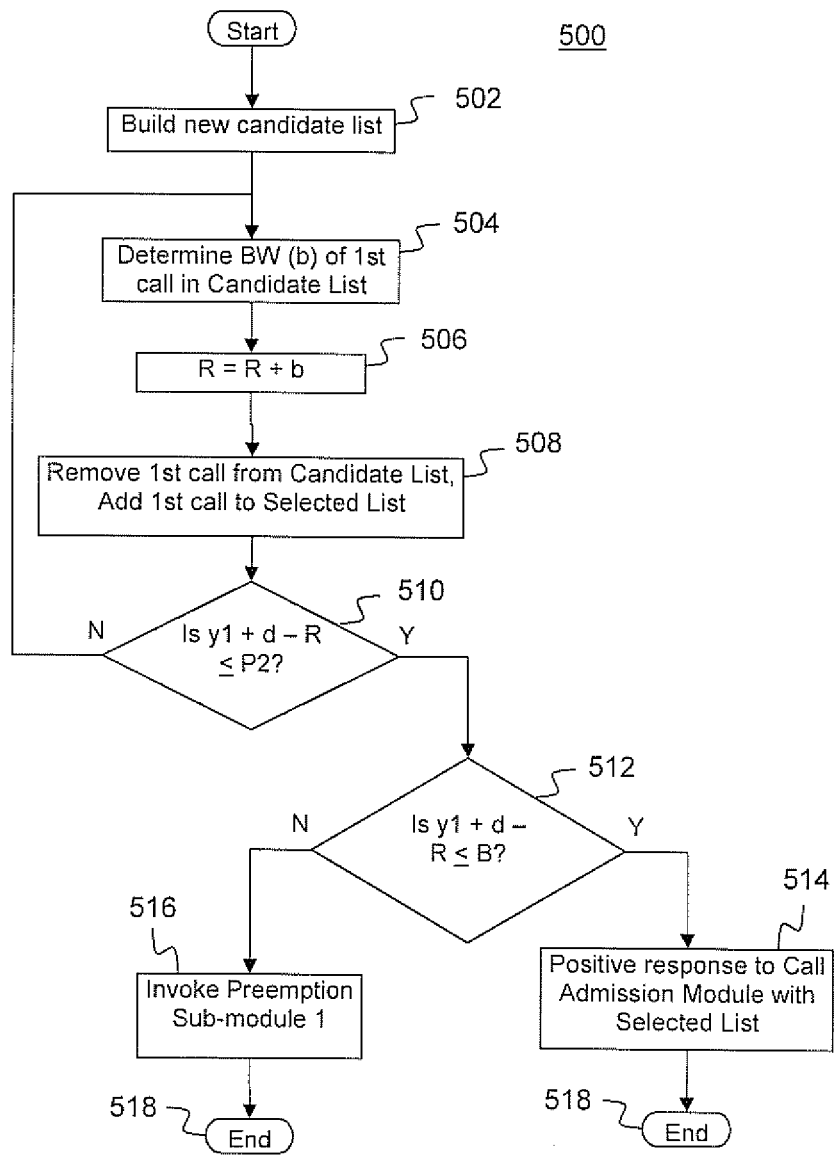
FIG. 5 illustrates a flow chart for an embodiment of a second sub-module of a call preemption process for high priority public safety call bearer set up.

Preemption Sub-module 2 is triggered from step 308 described previously, where preempting lower priority public safety calls could free up sufficient bandwidth to allow the incoming call. The objective of Preemption Sub-module 2 is to identify the lower priority public safety calls to be preempted. FIG. 5 is an illustration of a flowchart of the process logic of Preemption Sub-module 2. At step 502 the Candidate List is initialized to zero and then populated with all the lower priority public safety calls which could potentially be preempted. In one embodiment, the lower priority public safety calls are arranged in the reverse order of the time that the calls were admitted.

At step 504, the bandwidth "b" of the first call in the Candidate List is determined as previously described. At step 506, the process updates R to R+b. At step 508, the first call on the Candidate List is removed from the Candidate List and added to the preemption Selected List (the Selected List).

At step 510, the process checks whether there are enough lower priority PS calls that would be potentially preemptable such that, by preempting some of these calls, the incoming call could be admitted (i.e., y1+d−y2≤P2, where P2=The maximum allowable lower priority public safety traffic). If so, the process proceeds to step 512, other wise the process returns to step 504.

At step 512, the process checks whether enough bandwidth has been recovered (i.e., y1+d−R≤B) and no further preemption is required, in which case the process proceeds to step 514 where the preemption module then returns a positive response, together with the Selected List, to the call admission module. Otherwise, the process proceeds to step 516 where Preemption Sub-module 1 is invoked.

Admission Control and Preemption for Lower Priority PS Calls

Figure 6:
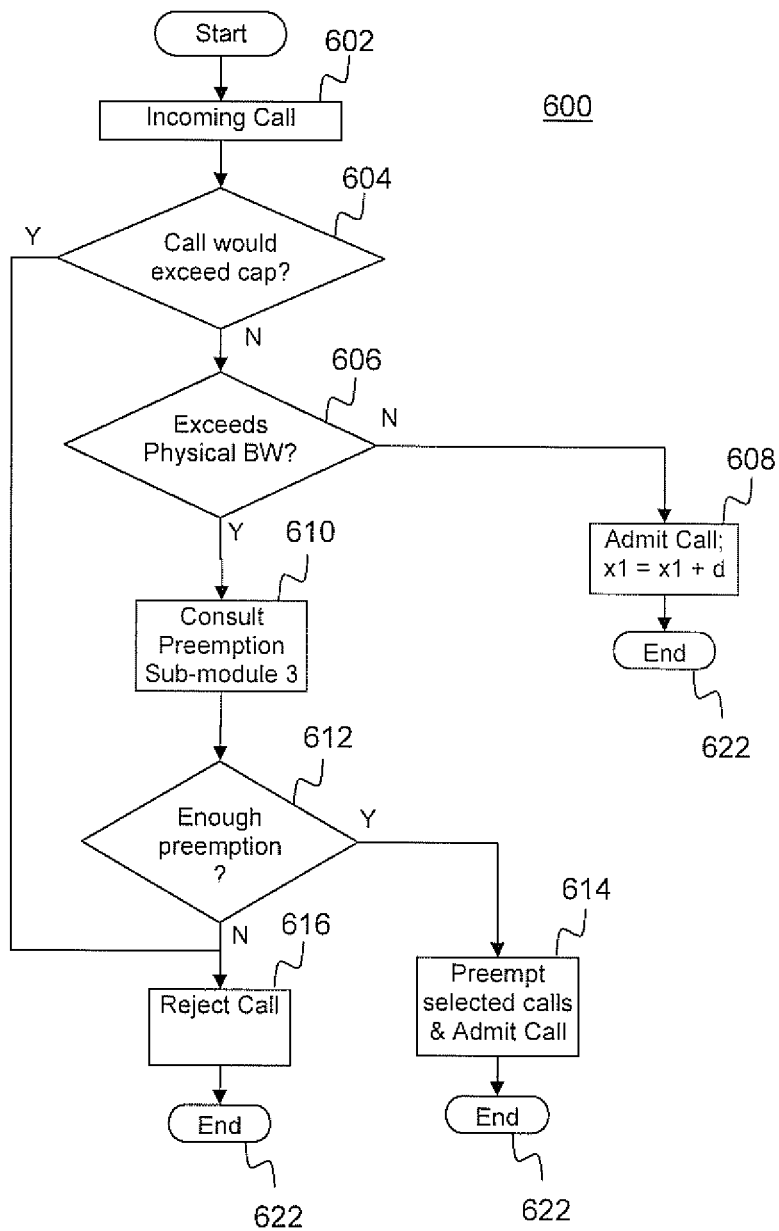
FIG. 6 illustrates a flow chart for an embodiment of a call admission control and preemption process for lower priority public safety call bearer set up.

Admission control for lower priority public safety traffic is similar to that of higher priority public safety calls. A lower priority public safety call may preempt consumer calls that exceed the allocated threshold C2. FIG. 6 illustrates a flowchart of an embodiment of an admission control and preemption process for lower priority public safety calls. At step 602, a lower priority public safety call arrives with demand "d" bps.

The logic for Preemption Sub-Module 3 is very similar to the logic illustrated in FIG. 4a (Preemption Sub-Module 1, Stage 1), with the exception that lower priority public safety calls can only preempt consumer calls and cannot preempt other lower priority public safety calls. Thus if the incoming call would exceed the cap or threshold at step 604, the incoming call would be rejected at step 616. If at step 604, the process determines that the incoming call would not exceed the cap, the process proceeds to step 606.

At step 606, the process determines if the total bandwidth exceeds the physical bandwidth (i.e.: x1+y1+d>B), in which case, at step 610, the process consults Preemption Sub-module 3 to determine whether, by preemption, enough bandwidth can be freed up to support the incoming call.

At step 612, if Preemption Sub-module 3 determines that by preempting other preemptable calls, enough bandwidth can be recovered, then the process proceeds to step 614, where the selected calls are preempted and the incoming call is admitted. Appropriate signaling messages would be sent to the end-points of the preempted calls. The value of x1 would also be updated to x1+d−d1, where d1 is the bandwidth of the pre-empted calls.

If the Preemption Sub-module 3 determines that insufficient bandwidth can be recovered by preempting other preemptable calls, the call will not be admitted. Depending on the policy of the network operator, the call requested can be queued or rejected. In either case, the appropriate signaling message is sent to the call originator.

Admission Control and Preemption for Higher Priority Consumer Calls

Figure 7:
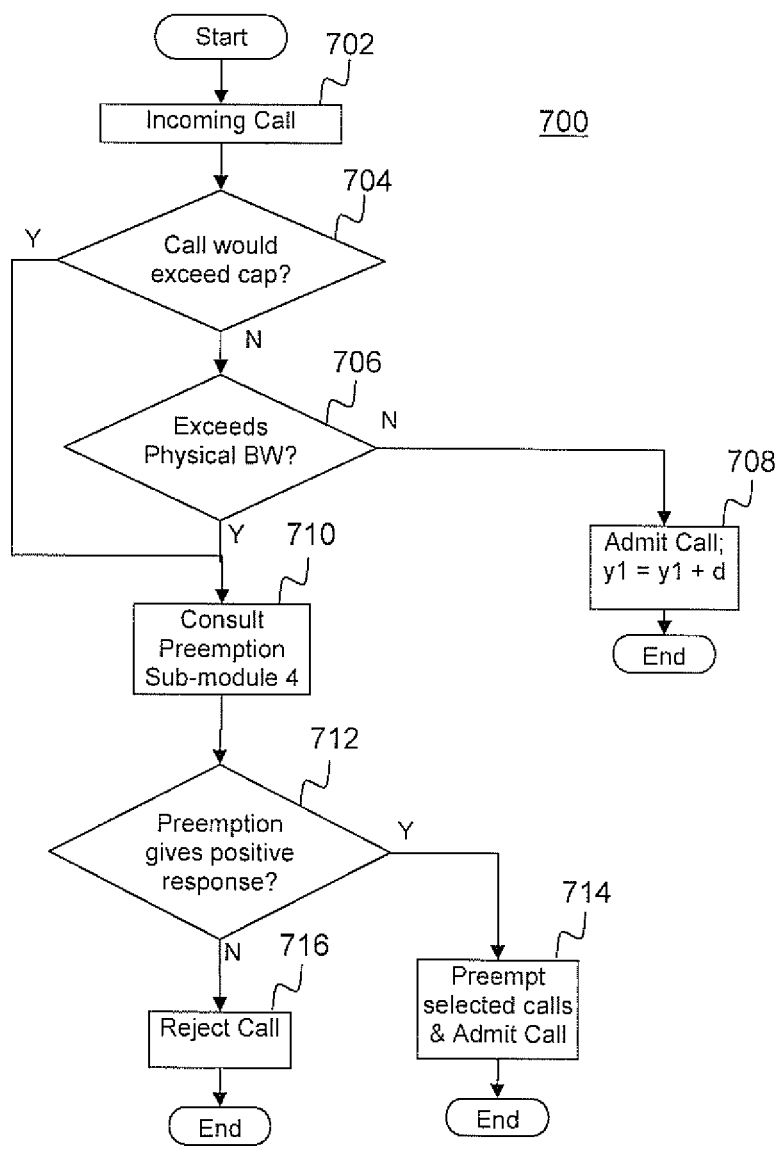
FIG. 7 illustrates a flow chart for an embodiment of a call admission control and preemption process for higher priority consumer call bearer set up.

FIG. 7 illustrates a flow chart for the call admission control process of higher priority consumer calls, whose preemption capability bit is set to TRUE in the ARP parameter (i.e., it can preempt other consumer calls with lower priority and whose PVB is set to TRUE). At step 702, a higher priority consumer call arrives with demand "d" (bps). A step 704, the Admission Control module checks whether, by accepting the incoming call, the total consumer traffic exceeds the allowable bandwidth cap (or threshold), (i.e. whether y1+d>C1), in which case the process consults Preemption Sub-module 4 at step 710. If not, the process proceeds to step 706 where the process checks whether, by accepting the call, the physical bandwidth of the air link is exceeded. If so, Preemption Sub-module 4 is consulted at step 710. If not, the incoming call is admitted at step 708 and y1 is updated to y1+d.

At step 712, if the Preemption Sub-module 4 gives a positive response, the process proceeds to step 714 where the selected calls are preempted and the incoming call is admitted. If the Preemption Sub-module 4 gives a negative result, then the call is rejected at step 716.

Preemption by Consumer Calls (Preemption Sub-Module 4)

The logic for Preemption Sub-module 4 is very similar to the logic described with respect to FIG. 4b (Preemption Sub-module 1, Stage 2), but with the following differences:

The initial Candidate List comprises consumer calls that have their PVB bit set to TRUE and have a priority level lower than the incoming call.

The initial Candidate list sorts calls according to priority level (lower priority first) and then by order of arrival (later calls first).

The Selected List is initialized as an empty list.

In addition to checking whether x1+y1+d−R≤B, the Preemption Sub-module 4 also checks whether y1+d−R≤C2. Both conditions need to be met to generate a positive response from the Preemption Sub-module 4.

R, the recovered bandwidth, is initialized as 0.

Admission Control for Consumer Calls with No Preemption Capability

The logic for admission control for consumer calls with the preemption capability bit set to FALSE is very similar to the call admission logic described with respect to FIG. 7, except there is no preemption capability, thus if an incoming call would exceed the cap or if the incoming call would exceed the physical bandwidth, the call is rejected.

Note that, in the above embodiments of the invention, consumer calls are divided into two groups, those with the preemption vulnerability bit (PVB) set to TRUE and those where the PVB are set to FALSE. Those with PVB set to TRUE will be preempted first. Among the calls with the same PBV value, time of arrival will be the factor in determining factor in deciding the call to be preempted. In one embodiment of the invention, all lower priority public safety calls have their preemption vulnerability bit (PVB) set to TRUE and so there is only one list. In another embodiment of the invention, the PBV bit may be set to either TRUE or FALSE by the UE. In this case, the list will be arranged as described previously for consumer calls.

In other embodiments of the present invention, instead LIFO ordering, calls could be randomly ordered within their respective groups in the Candidate List. Other variations in the arrangement of the list, based on other call parameters are also contemplated.

Speed Drop Back

As discussed previously, preemption of a call in this invention means:

The call is disconnected completely, or

The resources allocated to support the call (e.g., bandwidth) are reduced.

However, not all applications can operate at reduced speed. Even if the application can operate at reduced speed, it may only operate at certain specific levels. Consider streaming video as an example. The nominal speed for a particular video encoder may be 10 Mbps. The application may be willing to transmit at ¼ the nominal speed to reducing the screen size (½ the length and ½ the width). Therefore, the speed now is 2.5 Mps. By accepting B&W and forgoing color, a reduction of another 50% can be achieved. It is impractical, when a new call arrives and preemption is needed, for the eNodeB to request this information from the UEs.

Therefore, in some embodiments of the present invention specify the following information is encoded as new information elements (IE), be added to the LTE bearer set up messages (IP-CAN Session Modification, Bearer Set-up Request, and Request Bearer Resource Modification):

An indication that the application would support multiple QoS levels.

The different QoS levels that this application is willing to support.

For each QoS levels, the priority level of the level.

For example, for the streaming video described previously, the UE, UE A, may encode the QoS levels as follows:

10 Mps, priority 3, drop back OK

5 Mbps, priority 2, drop back OK 1.25 Mps, priority, no drop-back, non-preemptable In this example, let us assume that, when the bearer from a first UE is initially set up, the traffic is lightly loaded. Thus, the eNodeB will allocate 10 Mbps for this flow. At a later time, a priority 2 call from a second UE arrives (which needs 4 Mps) and preemption is needed. In this case, the eNodeB may decide to drop the speed of the call from the first UE to 5 Mps and admit the call from the second UE. This is acceptable as the priority of the call from the second UE is higher than the priority of the QoS level of 10 Mbps for the first UE. Signaling message(s) will be sent to the first UE to inform it that the speed of the bearer is reduced. At a later time, the speed of bearer of the first UE could be further reduced to 1.25 Mps because of traffic congestion. However, when operating at 1.25 Mbps, the QoS level will not be further reduced as it has the highest priority. As traffic conditions improve, the eNodeB may increase the bandwidth of the bearer when it is possible.

In general, when such a call arrives at the eNodeB, the node will first try to admit the call as a priority 3 call with a demand of 10 Mbps. If the call is not admitted, the node will try to admit the call as a priority 2 call with a demand of 5 Mbps. If this fails, the node will try to admit the call as a priority 1 call with a demand of 1.25 Mbps. If this fails, the call is then not admitted.

OTHER EMBODIMENTS

There are multiple embodiments of the present invention contemplated. For example, in selecting the calls to be preempted, LIFO is not the only selection criterion. Other embodiments include (a) random selection, (b) best fit (i.e., least amount of bandwidth preempted), (c) least number of calls, and (d) combinations of the above. Additional embodiments of the present invention support a multiple number of the priority levels for public safety traffic greater than 2 (e.g., the preemption algorithm just needs to be extended to include multiple stages instead of 2 stages as previous described).

Also, it is possible the network operator can offer two grades of consumer services, a lower grade of service will be cheaper but at the risk of being more likely to be preempted. In this case, the Candidate List in the preemption algorithm should be arranged with the less expensive calls first, then the calls with the high grade of service.

It is envisioned that embodiments of the present invention can be implemented as software modules within physical network elements. A natural place for these modules to reside is the eNodeB. Other possible placement of these modules is in the PCRF. Another natural place that they may reside is the PCRF. In this case, the eNodeB (or a plurality of eNodeBs) would report to the PCRF periodically, at reasonably frequent intervals, the traffic loading, as well as the calls of each air-link under the control of each eNodeB. This would add additional complexity to the system architecture compared to implementation in an eNodeB. However, it would the added benefit that the backhaul portion of the radio access network could also be managed, in addition to the air-links, for call admission.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A system for providing call admission control for a Long Term Evolution (LTE) network shared between a plurality of user classes, the system comprising:
    an eNodeB configured to:
    maintain a call admission policy profile including call type privilege parameters for each of said plurality of user classes;
    enforce said call admission policy profile during call setup of an incoming public safety call to the LTE network, wherein one of said call type privilege parameters for each of said plurality of user classes comprises a bandwidth cap for the respective user class;
    determine that a bandwidth required to set up said incoming call exceeds the bandwidth cap of the respective user class of said incoming call;
    generate a candidate list of calls that are preemptable by said incoming call;
    determine an amount of bandwidth that would be recovered by preempting a first call in the candidate list of calls;
    move the first call to a selected list of calls; and
    preempting the selected list of calls if the amount of bandwidth that would be recovered is greater than the bandwidth required to set up said incoming call,
    wherein preempting a call includes reducing resources allocated to support the call.

2. The system of claim 1, wherein one of said call type privilege parameters comprises a preemption protection bandwidth threshold that defines a bandwidth of a first class of users that is protected from preemption, wherein calls of the first class of users cannot be preempted if a bandwidth used by the first class is less than the preemption protection bandwidth threshold.

3. The system of claim 2, wherein the eNodeB is further configured to: determine that preempting the first call would reduce the bandwidth used below the preemption protection bandwidth threshold; and remove the first call from the candidate list.

4. The system of claim 1, wherein said call type privilege parameters further comprise a relative priority for each of said plurality of user classes.

5. The system of claim 4, wherein one of said user classes comprises a public safety user class.

6. The system of claim 5, wherein one of said user classes comprises a consumer user class.

7. The system of claim 6, wherein said eNodeB is configured to determine if accepting said incoming call would cause network resources to be exceeded.

8. The system of claim 6, wherein said eNodeB is configured to determine if accepting said incoming call would cause the bandwidth cap of the user class of said incoming call to be exceeded.

9. The system of claim 1, wherein the candidate list comprises calls of said user class of said incoming call.

10. The system of claim 1, wherein the eNodeB is further configured to: determine that the amount of bandwidth that would be recovered by preempting the first call in the candidate list of calls would recover less bandwidth than the bandwidth required to set up said incoming call; and move a second call to the selected list of calls.

11. A system for providing admission control for a Long Term Evolution (LTE) network shared between a first class of users and a second class of users, the system comprising:
    an eNodeB configured to:
    maintain a call admission policy profile including call type privilege parameters;
    enforce said call admission policy profile during a public safety call setup in the LTE network;
    select calls to preempt when there are insufficient network resources to set up a call, wherein said call admission policy profile includes a first cap limiting maximum bandwidth of calls from said first class of users;
    generate a candidate list of calls that are preemptable by said incoming call;
    determine an amount of bandwidth that would be recovered by preempting a first call in the candidate list of calls;
    moving the first call to a selected list of calls; and
    preempting the selected list of calls if the amount of bandwidth that would be recovered is greater than a bandwidth required to set up said incoming call,
    wherein preempting a call includes reducing resources allocated to support the call.

12. The system of claim 11, wherein said call admission profile includes a first threshold of bandwidth of calls of the first class of users that is protected from preemption by the second class of users.

13. The system of claim 12, wherein said call admission profile includes a second cap limiting maximum bandwidth of calls from said second class of users.

14. The system of claim 13 wherein said eNodeB is configured to establish a list of potential preemption candidates from a list of established calls wherein said list of preemption candidates is sorted in a preferred order of preemption.

15. The system of claim 14 wherein said preferred order of preemption is from low priority groups to high priority groups.

16. The system of claim 15 wherein said preferred order of preemption is from last-established call to first-established call within each priority group.

17. The system of claim 13, wherein said call admission profile comprises:
   a total bandwidth parameter;
   a maximum allowable total high priority traffic parameter; and
   a maximum allowable lower priority traffic parameter.

18. The system of claim 13, wherein said call type privilege parameters comprise:
   a priority level parameter;
   a preemption privilege parameter; and
   a preemption vulnerability parameter.

19. The system of claim 12, wherein said call admission profile includes a third cap limiting maximum bandwidth of calls from said first class of users.

20. A method of providing call admission control for a shared Long Term Evolution (LTE) network, the method comprising steps of:
   determining, by an eNodeB of the LTE network, if an incoming public safety call would exceed a predetermined public safety call bandwidth threshold;
   determining if said incoming public safety call would exceed a total available bandwidth;
   if said public safety call bandwidth threshold or said total available bandwidth would be exceeded, invoking a preemption procedure to build a list of preemption candidates from a list of established calls wherein said list of preemption candidates is sorted in a preferred order of preemption;
   determining an amount of bandwidth that would be recovered by preempting a first call in the list of preemption candidates;
   moving the first call to a selected list of calls; and
   preempting the selected list of calls if the amount of bandwidth that would be recovered is greater than a bandwidth required to set up said incoming public safety call,
   wherein preempting a call includes reducing resources allocated to support the call.

* * * * *